US007569653B2

(12) United States Patent
Landon

(10) Patent No.: US 7,569,653 B2
(45) Date of Patent: Aug. 4, 2009

(54) SEALANT COMPOSITION HAVING REDUCED PERMEABILITY TO GAS

(75) Inventor: Shayne J. Landon, Ballston Lake, NY (US)

(73) Assignee: Momentive Performance Materials Inc., Wilton, CT (US)

(*) Notice: Subject to any disclaimer, the term of this patent is extended or adjusted under 35 U.S.C. 154(b) by 393 days.

(21) Appl. No.: 11/345,563

(22) Filed: Feb. 1, 2006

(65) Prior Publication Data

US 2007/0179242 A1 Aug. 2, 2007

(51) Int. Cl.
C08G 18/06 (2006.01)
(52) U.S. Cl. .......................................... 528/65; 528/66
(58) Field of Classification Search ................. 524/588; 525/106
See application file for complete search history.

(56) References Cited

U.S. PATENT DOCUMENTS

| | | | |
|---|---|---|---|
| 3,627,722 A | 12/1971 | Selter et al. | |
| 3,632,557 A | 1/1972 | Brode et al. | |
| 3,786,081 A | 1/1974 | Oppenlaender et al. | |
| 3,829,505 A | 8/1974 | Herold et al. | |
| 3,941,849 A | 3/1976 | Herold | |
| 3,971,751 A | 7/1976 | Isayama et al. | |
| 4,242,490 A | 12/1980 | Emerson et al. | |
| 4,335,188 A | 6/1982 | Igi et al. | |
| 4,345,053 A | 8/1982 | Rizk et al. | |
| 4,374,237 A | 2/1983 | Berger et al. | |
| 4,481,367 A | 11/1984 | Knopf | |
| 4,625,012 A | 11/1986 | Rizk et al. | |
| 4,645,816 A | 2/1987 | Pohl et al. | |
| 4,687,851 A | 8/1987 | Laughner | |
| 4,798,878 A | 1/1989 | Brinkmann et al. | |
| 4,820,368 A * | 4/1989 | Markevka et al. | 156/307.3 |
| 4,889,879 A * | 12/1989 | Seinera et al. | 524/13 |
| 4,985,491 A | 1/1991 | Reisch | |
| 5,096,993 A | 3/1992 | Smith et al. | |
| 5,100,997 A | 3/1992 | Reisch et al. | |
| 5,106,874 A | 4/1992 | Porter et al. | |
| 5,116,931 A | 5/1992 | Reisch et al. | |
| 5,120,379 A | 6/1992 | Noda et al. | |
| 5,136,010 A | 8/1992 | Reisch et al. | |
| 5,185,420 A | 2/1993 | Smith et al. | |
| 5,266,681 A | 11/1993 | Reisch et al. | |
| 5,364,955 A | 11/1994 | Zweiner et al. | |
| 5,441,808 A * | 8/1995 | Anderson et al. | 428/349 |
| 5,464,888 A | 11/1995 | Owen | |
| 5,519,104 A | 5/1996 | Lucas | |
| 5,539,045 A | 7/1996 | Potts et al. | |
| 5,567,530 A | 10/1996 | Drujon et al. | |
| 5,623,044 A | 4/1997 | Chiao | |
| 5,804,253 A | 9/1998 | Hagiwara et al. | |
| 5,849,832 A | 12/1998 | Virnelson et al. | |
| 5,852,137 A | 12/1998 | Hsieh et al. | |
| 5,919,888 A | 7/1999 | Lawrey et al. | |
| 5,990,258 A | 11/1999 | Peter | |
| 6,001,946 A | 12/1999 | Waldman et al. | |
| 6,103,850 A * | 8/2000 | Reichel et al. | 528/60 |
| 6,121,354 A | 9/2000 | Chronister | |
| 6,136,446 A | 10/2000 | Virnelson et al. | |
| 6,136,910 A | 10/2000 | Virnelson et al. | |
| 6,150,441 A | 11/2000 | Chiba et al. | |
| 6,197,912 B1 | 3/2001 | Huang et al. | |
| 6,207,794 B1 | 3/2001 | Yamasaki et al. | |
| 6,265,517 B1 | 7/2001 | Stuart | |
| 6,284,360 B1 | 9/2001 | Johnson et al. | |
| 6,303,731 B1 | 10/2001 | Carlson et al. | |
| 6,310,170 B1 | 10/2001 | Johnston et al. | |
| 6,355,317 B1 * | 3/2002 | Reid et al. | 428/34 |
| 6,359,101 B1 | 3/2002 | O'Connor et al. | |
| 6,372,827 B2 | 4/2002 | Johnson et al. | |
| 6,406,782 B2 | 6/2002 | Johnson et al. | |
| 6,448,362 B1 * | 9/2002 | McGraw et al. | 528/44 |
| 6,457,294 B1 | 10/2002 | Virnelson et al. | |
| 6,487,294 B1 | 11/2002 | Alexander | |
| 6,498,210 B1 | 12/2002 | Wang et al. | |
| 6,515,164 B1 | 2/2003 | Bolte et al. | |
| 6,602,964 B2 | 8/2003 | Huang et al. | |
| 6,784,272 B2 | 8/2004 | Mack et al. | |
| 6,822,035 B2 * | 11/2004 | Chaiko | 524/445 |
| 6,828,403 B2 | 12/2004 | Mahdi et al. | |
| 6,833,423 B2 | 12/2004 | Roesler et al. | |
| 2002/0100550 A1 | 8/2002 | Mahdi et al. | |

(Continued)

FOREIGN PATENT DOCUMENTS

EP 676 403 7/1978

(Continued)

OTHER PUBLICATIONS

Burnside et al., "Nanostructure and Properties of Polysiloxane-Layered Silicate Nanocomposites", Dept. of Materials Science and Engineering, Bard Hall, Itahaca, New York 14850, pp. 1595-1604, Mar. 28, 2000.

(Continued)

Primary Examiner—Randy Gulakowski
Assistant Examiner—Robert Loewe
(74) Attorney, Agent, or Firm—David G. Vicari

(57) ABSTRACT

This invention relates to a moisture-curable silylated resin-containing composition containing, inter alia, moisture-curable silylated resin, the cured composition exhibiting low permeability to gas(es).

23 Claims, No Drawings

U.S. PATENT DOCUMENTS

| | | | |
|---|---|---|---|
| 2002/0194813 A1 | 12/2002 | Virnelson et al. | |
| 2002/0198352 A1 | 12/2002 | Tanaka et al. | |
| 2003/0162882 A1 | 8/2003 | Grimm et al. | |
| 2003/0176537 A1* | 9/2003 | Chaiko | 523/200 |
| 2004/0122253 A1 | 6/2004 | Smith et al. | |
| 2004/0180155 A1 | 9/2004 | Nguyen-Misra et al. | |
| 2004/0181007 A1* | 9/2004 | Acevedo et al. | 524/589 |
| 2004/0188016 A1 | 9/2004 | Mahdi et al. | |
| 2004/0258859 A1* | 12/2004 | Acevedo et al. | 428/34 |
| 2005/0020706 A1 | 1/2005 | Kollbach et al. | |
| 2005/0191490 A1* | 9/2005 | Ton-That et al. | 428/407 |
| 2006/0128866 A1* | 6/2006 | Diakoumakos et al. | 524/445 |
| 2006/0235128 A1* | 10/2006 | Wang et al. | 524/445 |
| 2007/0105998 A1* | 5/2007 | Gong et al. | 524/236 |
| 2007/0106006 A1* | 5/2007 | Cooper et al. | 524/445 |
| 2007/0178256 A1* | 8/2007 | Landon | 428/34 |

FOREIGN PATENT DOCUMENTS

| | | |
|---|---|---|
| EP | 0-931-800 | 7/1999 |
| EP | 1462 500 | 9/2004 |
| FR | 1.411.160 | 9/1965 |
| WO | WO 9731057 A1 * | 8/1997 |
| WO | WO 98/58003 | 12/1998 |
| WO | 01/16201 | 3/2001 |
| WO | WO 01/16046 | 3/2001 |
| WO | WO 2004056913 A1 * | 7/2004 |
| WO | WO 2004/083296 | 9/2004 |

OTHER PUBLICATIONS

Y. Geerts et al., "Morphology and Permeability of Polymer Blends-I. Crosslinked EPDM-Silicone Blends", Eur. Polym. J. vol. 32, No. 2, pp. 143-145, 1996.

Peter C. LeBaron et al., "Clay Nanolayer Reinforcement of a Silicone Elastomer", Chem. Mater. 2001, 13, pp. 3760-3765, Jun. 26, 2001.

K. Mizoguchi et al., "Miscibility and gas permeability of poly (ethylene-co-5, 4 mole% 3. 5. 5-trimethylhexyl methacrylate) polydimethyl-siloxane blends", Colloid Polym Sci 275:86 90 (1997), pp. 87-90, 1997.

International Search Report Form PCT/ISA/210 with Form PCT/ISA/220 and Written Opinion of International Search Authority.

Alexandre M. et al., (2000) "Polymer-layered silicate nanocomposites: preparation, properties and uses of a new class Of materials", *Materials Science and Engineering Reports*, vol. 2, No. 1-2, pp. 1-63.

Ginzburg V.V. et al. (1999) "Calculating Phase Diagrams of Polymer—Platelet Mixtures Using Density Functional Theory; Implications for Polymer/Clay composites", *Macromolecules*, ACS, vol. 32, pp. 5681-5688.

* cited by examiner

SEALANT COMPOSITION HAVING REDUCED PERMEABILITY TO GAS

FIELD OF THE INVENTION

This invention relates to moisture-curable silylated resin-containing compositions having reduced gas permeability and methods of using these compositions. The compositions are particularly well suited for use in the window area as an insulating glass sealant and in applications such as coatings, adhesives and gaskets.

BACKGROUND OF THE INVENTION

Moisture-curable compositions are well known for their use as sealants. In the manufacture of Insulating Glass Units (IGU), for example, panels of glass are placed parallel to each other and sealed at their periphery such that the space between the panels, or the inner space, is completely enclosed. The inner space is typically filled with a gas or mixture of gases of low thermal conductivity.

Current room temperature curable (RTC) silicone sealant, while effective to some extent, still have only a limited ability to prevent the loss of low thermal conductivity gas, e.g., argon, from the inner space of an IGU. Over time, the gas will escape reducing the thermal insulation effectiveness of the IGU to the vanishing point.

A need therefore exists for an RTC composition of reduced gas permeability compared to that of known RTC compositions. When employed as the sealant for an IGU, an RTC composition of reduced gas permeability will retain the intra-panel insulating gas of an IGU for a longer period of time compared to that of a more permeable RTC composition and therefore will extend the insulating properties of the IGU over a longer period of time.

SUMMARY OF THE INVENTION

The present invention is based on the discovery that moisture-curable silylated resin-containing composition combined with at least one other polymer having a permeability to gas that is less than the permeability of cured resin upon curing exhibits reduced permeability to gas. The composition is especially suitable for use as a sealant where high gas barrier properties together with the desired characteristics of softness, processability and elasticity are important performance criteria.

In accordance with the present invention, there is provided a moisture-curable silylated resin-containing composition comprising:

a) moisture-curable silylated resin, which upon curing, provides a cured resin exhibiting permeability to gas;

b) at least one other polymer having a permeability to gas that is less than the permeability of cured resin (a); and, optionally, c) at least one additional component selected from the group consisting of catalyst, adhesion promoter, filler, surfactant, UV stabilizer, antioxidant, cure accelerator, thixotropic agent, moisture scavenger, pigment, dye, solvent and biocide.

When used as a gas barrier, e.g., in the manufacture of an IGU, the foregoing composition reduces the loss of gas(es) thus providing a longer service life of the article in which it is employed.

DETAILED DESCRIPTION OF THE INVENTION

In accordance with the present invention, the moisture-curable silylated resin-containing composition of the present invention is a resinous composition comprising: a) moisture-curable silylated resin, which upon curing, provides a cured resin i.e., hydrolyzed and subsequently crosslinked, silylated polyurethane (SPUR) resin exhibiting permeability to gas, in intimate admixture with b) at least one other polymer having a permeability to gas that is less than the permeability of cured resin (a); and, optionally, c) at least one additional component selected from the group consisting of catalyst, adhesion promoter, filler, surfactant, UV stabilizer, antioxidant, cure accelerator, thixotropic agent, moisture scavenger, pigment, dye, solvent and biocide.

The compositions of the invention are useful for the manufacture of sealants, coatings, adhesives, gaskets, and the like, and are particularly suitable for use in sealants intended for insulating glass units.

The moisture-curable silylated resin (a) which can be employed in the present invention are known materials and in general can be obtained by (i) reacting an isocyanate-terminated polyurethane (PUR) prepolymer with a suitable silane, e.g., one possessing both hydrolyzable functionality, such as, alkoxy etc., and active hydrogen-containing functionality such as mercaptan, primary and secondary amine, preferably the latter, etc., or by (ii) reacting a hydroxyl-terminated PUR prepolymer with a suitable isocyanate-terminated silane, e.g., one possessing one to three alkoxy groups. The details of these reactions, and those for preparing the isocyanate-terminated and hydroxyl-terminated PUR prepolymers employed therein can be found in, amongst others: U.S. Pat. Nos. 4,985,491, 5,919,888, 6,207,794, 6,303,731, 6,359,101 and 6,515,164 and published U.S. Patent Application Nos. 2004/0122253 and 2005/0020706 (isocyanate-terminated PUR prepolymers); U.S. Pat. Nos. 3,786,081 and 4,481,367 (hydroxyl-terminated PUR prepolymers); U.S. Pat. Nos. 3,627,722, 3,632,557, 3,971,751, 5,623,044, 5,852,137, 6,197,912 and 6,310,170 (moisture-curable SPUR obtained from reaction of isocyanate-terminated PUR prepolymer and reactive silane, e.g., aminoalkoxysilane); and, U.S. Pat. Nos. 4,345,053, 4,625,012, 6,833,423 and published U.S. Patent Application 2002/0198352 (moisture-curable SPUR obtained from reaction of hydroxyl-terminated PUR prepolymer and isocyanatosilane). The entire contents of the foregoing U.S. patent documents are incorporated by reference herein.

The moisture-curable silylated resin (a) of the present invention may also be obtained by (iii) reacting isocyanatosilane directly with polyol.

(a) Moisture-Curable SPUR Resin Obtained from Isocyanate-Terminated PUR Prepolymer The isocyanate-terminated PUR prepolymers are obtained by reacting one or more polyols, advantageously, diols, with one or more polyisocyanates, advantageously, diisocyanates, in such proportions that the resulting prepolymers will be terminated with isocyanate. In the case of reacting a diol with a diisocyanate, a molar excess of diisocyanate will be employed.

Included among the polyols that can be utilized for the preparation of the isocyanate-terminated PUR prepolymer are polyether polyols, polyester polyols such as the hydroxyl-terminated polycaprolatones, polyetherester polyols such as those obtained from the reaction of polyether polyol with e-caprolactone, polyesterether polyols such as those obtained from the reaction of hydroxyl-terminated polycaprolactones with one or more alkylene oxides such as ethylene oxide and propylene oxide, hydroxyl-terminated polybutadienes, and the like.

Specific suitable polyols include the polyether diols, in particular, the poly(oxyethylene) diols, the poly(oxypropylene) diols and the poly(oxyethylene-oxypropylene) diols, polyoxyalkylene triols, polytetramethylene glycols, polyacetals, polyhydroxy polyacrylates, polyhydroxy polyester amides and polyhydroxy polythioethers, polycaprolactone diols and triols, and the like. In one embodiment of the present invention, the polyols used in the production of the isocyanate-terminated PUR prepolymers are poly(oxyethylene) diols with equivalent weights between about 500 and 25,000. In another embodiment of the present invention, the polyols used in the production of the isocyanate-terminated PUR prepolymers are poly(oxypropylene) diols with equivalent weights between about 1,000 to 20,000. Mixtures of polyols of various structures, molecular weights and/or functionalities can also be used.

The polyether polyols can have a functionality up to about 8 but advantageously have a functionality of from about 2 to 4 and more advantageously, a functionality of 2 (i.e., diols). Especially suitable are the polyether polyols prepared in the presence of double-metal cyanide (DMC) catalysts, an alkaline metal hydroxide catalyst, or an alkaline metal alkoxide catalyst; see, for example, U.S. Pat. Nos. 3,829,505, 3,941,849, 4,242,490, 4,335,188, 4,687,851, 4,985,491, 5,096,993, 5,100,997, 5,106,874, 5,116,931, 5,136,010, 5,185,420, and 5,266,681, the entire contents of which are incorporated here by reference. Polyether polyols produced in the presence of such catalysts tend to have high molecular weights and low levels of unsaturation, properties of which, it. is believed, are responsible for the improved performance of inventive retroreflective articles. The polyether polyols preferably have a number average molecular weight of from about 1,000 to about 25,000, more preferably from about 2,000 to about 20,000, and even more preferably from about 4,000 to about 18,000. The polyether polyols preferably have an end group unsaturation level of no greater than about 0.04 milliequivalents per gram of polyol. More preferably, the polyether polyol has an end group unsaturation of no greater than about 0.02 milliequivalents per gram of polyol. Examples of commercially available diols that are suitable for making the isocyanate-terminate PUR prepolymer include ARCOL R-1819 (number average molecular weight of 8,000), E-2204 (number average molecular weight of 4,000), and ARCOL E-2211 (number average molecular weight of 11,000).

Any of numerous polyisocyanates, advantageously, diisocyanates, and mixtures thereof, can be used to provide the isocyanate-terminated PUR prepolymers. In one embodiment, the polyisocyanate can be diphenylmethane diisocyanate ("MDI"), polymethylene polyphenylisocyanate ("PMDI"), paraphenylene diisocyanate, naphthylene diisocyanate, liquid carbodiimide-modified MDI and derivatives thereof, isophorone diisocyanate, dicyclohexylmethane-4,4'-diisocyanate, toluene diisocyanate ("TDI"), particularly the 2,6-TDI isomer, as well as various other aliphatic and aromatic polyisocyanates that are well-established in the art, and combinations thereof.

Silylation reactants for reaction with the isocyanate-terminated PUR prepolymers described above must contain functionality that is reactive with isocyanate and at least one readily hydrolyzable and subsequently crosslinkable group, e.g., alkoxy. Particularly useful silylation reactants are the aminosilanes, especially those of the general formula:

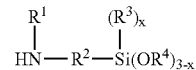

wherein $R^1$ is hydrogen, alkyl or cycloalkyl of up to 8 carbon atoms or aryl of up to 8 carbon atoms, $R^2$ is an alkylene group of up to 12 carbon atoms, optionally containing one or more heteroatoms, each $R^3$ is the same or different alkyl or aryl group of up to 8 carbon atoms, each $R^4$ is the same or different alkyl group of up to 6 carbon atoms and x is 0, 1 or 2. In one embodiment, $R^1$ is hydrogen or a methyl, ethyl, propyl, isopropyl, n-butyl, t-butyl, cyclohexyl or phenyl group, $R^2$ possesses 1 to 4 carbon atoms, and each $R^4$ is the same or different methyl, ethyl, propyl or isopropyl group and x is 0.

Specific aminosilanes for use herein include aminopropyltrimethoxysilane, aminopropyltriethoxysilane, aminobutyltriethoxysilane, N-(2-aminoethyl-3-aminopropyl)triethoxysilane, aminoundecyltrimethoxysilane, and aminopropylmethyldiethoxysilane, for example. Other suitable aminosilanes include, but are not limited to phenylaminopropyltriemthoxy silane, methylaminopropyltriemthoxysilane, n-butylaminopropyltrimethoxy silane, t-butyl aminopropyltrimethoxysilane, cyclohexylaminopropyltrimethoxysilane, dibutylmaleate aminopropyltriemthoxysilane, dibutylmaleate-substituted 4-amino-3,3-dimethylbutyl trimethoxy silane, N-methyl-3-amino-2-methylpropyltriemthoxysilane, N-ethyl-3-amino-2-methylpropyltrimethoxysilane, N-ethyl-3-amino-2-methylpropyidiethoxysilane, N-ethyl-3-amino-2-methylpropyoltriethoxysilane, N-ethyl-3-amino-2-methylpropylmethyidimethoxysilane, N-butyl-3-amino-2-methylpropyltriemthoxysilane, 3-(N-methyl-3-amino-1-methyl-1-ethoxy)propyltrimethoxysi lane, N-ethyl-4-amino-3,3-dimethylbutyidimethoxymethylsilane and N-ethyl-4-amino-3,3-dimethylbutyltrimethoxysilane.

A catalyst will ordinarily be used in the preparation of the isocyanate-terminated PUR prepolymers. Advantageously, condensation catalysts are employed since these will also catalyze the cure (hydrolysis followed by crosslinking) of the SPUR resin component of the curable compositions of the invention. Suitable condensation catalysts include the dialkyltin dicarboxylates such as dibutyltin dilaurate and dibutyltin acetate, tertiary amines, the stannous salts of carboxylic acids, such as stannous octoate and stannous acetate, and the like. In one embodiment of the present invention, dibutyltin dilaurate catalyst is used in the production of the PUR prepolymer. Other useful catalysts include zirconium complex KAT XC6212, K-KAT XC-A209 available from King Industries, Inc., aluminum chelate TYZER® types available from DuPont Company, and KR types available from Kenrich Petrochemical, Inc., and other organic metal, such as Zn, Co, Ni, and Fe, and the like.

(b) Moisture-Curable SPUR Resins Obtained from Hydroxyl-Terminated PUR Prepolymers The moisture-curable SPUR resin can, as previously indicated, be prepared by reacting a hydroxyl-terminated PUR prepolymer with an isocyanatosilane. The hydroxyl-terminated PUR prepolymer can be obtained in substantially the same manner employing substantially the same materials, i.e., polyols, polyisocyanates and optional catalysts (preferably condensation catalysts), described above for the preparation of isocyanate-terminated PUR prepolynmers the one major difference being that the proportions of polyol and polyisocyanate will be such as to result in hydroxyl-termination in the resulting prepolymer. Thus, e.g., in the case of a diol and a diisocyanate, a molar excess of the former will be used thereby resulting in hydroxyl-terminated PUR prepolymer.

Useful silylation reactants for the hydroxyl-terminated SPUR resins are those containing isocyanate termination and readily hydrolizable functionality, e.g., 1 to 3 alkoxy groups. Suitable silylating reactants are the isocyanatosilanes of the general formula:

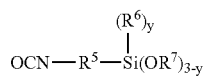

wherein $R^5$ is an alkylene group of up to 12 carbon atoms, optionally containing one or more heteroatoms, each $R^6$ is the same or different alkyl or aryl group of up to 8 carbon atoms, each $R^7$ is the same or different alkyl group of up to 6 carbon atoms and y is 0, 1 or 2. In one embodiment, $R^5$ possesses 1 to 4 carbon atoms, each $R^7$ is the same or different methyl, ethyl, propyl or isopropyl group and y is 0.

Specific isocyanatosilanes that can be used herein to react with the foregoing hydroxyl-terminated PUR prepolymers to provide moisture-curable SPUR resins include isocyanatopropyltrimethoxysilane, isocyanatoisopropyl trimethoxysilane, isocyanato-n-butyltrimethoxysilane, isocyanato-t-butyltrimethoxysilane, isocyanatopropyltriethoxysilane, isocyanatoisopropyltriethoxysilane, isocynato-n-butyltriethoxysilane, isocyanato-t-butyltriethoxysilane, and the like.

(c) Moisture-Curable SPUR Resins Obtained from Reacting Isocyanatosilane Directly with a Polyol The moisture-curable SPUR resins of the present invention can be obtained from one or more polyols, advantageously, diols, reacting directly with isocyanatosilane without the initial formation of a polyurethane prepolymer. The materials, i.e., polyols and silanes (e.g., one possessing both hydrolysable and isocyanato functionality), useful for this approach to producing moisture-curable SPUR resin are described above. As such, suitable polyols include, hydroxy-terminated polyols having a molecular weight between about 4,000 to 20,000. However, mixtures of polyols of various structures, molecular weights and/or functionalities can also be used. Suitable isocyanatosilanes used to react with the foregoing polyols to provide moisture-curable SPUR resins are described above.

The urethane prepolymer synthesis and subsequent silylation reaction, as well as the direct reaction of polyol and isocyanatosilane are conducted under anhydrous conditions and preferably under an inert atmosphere, such as a blanket of nitrogen, to prevent premature hydrolysis of the alkoxysilane groups. Typical temperature range for both reaction steps, is 0° to 150° C., and more preferably between 60° and 90° C. Typically, the total reaction time for the synthesis of the silylated polyurethane is between 4 to 8 hours.

The synthesis is monitored using a standard titration technique (ASTM 2572-87) or infrared analysis. Silylation of the urethane prepolymers is considered complete when no residual —NCO can be detected by either technique.

The silicone composition of the present invention further comprises at least one other polymer (b) exhibiting permeability to a gas, or mixture of gases, that is less than the permeability of moisture-curable silylated resin (a). Suitable polymers include polyethylenes, such as, low density polyethylene (LDPE), very low density polyethylene (VLDPE), linear low density polyethylene (LLDPE) and high density polyethylene (HDPE); polypropylene (PP), polyisobutylene (PIB), polyvinyl acetate(PVAc), polyvinyl alcohol (PVoH), polystyrene, polycarbonate, polyester, such as, polyethylene terephthalate (PET), polybutylene terephthalate (PBT), polyethylene napthalate (PEN), glycol-modified polyethylene terephthalate (PETG); polyvinylchloride (PVC), polyvinylidene chloride, polyvinylidene floride, thermoplastic polyurethane (TPU), acrylonitrile butadiene styrene (ABS), polymethylmethacrylate (PMMA), polyvinyl fluoride (PVF), Polyamides (nylons), polymethylpentene, polyimide (PI), polyetherimide (PEI), polether ether ketone (PEEK), polysulfone, polyether sulfone, ethylene chlorotrifluoroethylene, polytetrafluoroethylene (PTFE), cellulose acetate, cellulose acetate butyrate, plasticized polyvinyl chloride, ionomers (Surtyn), polyphenylene sulfide (PPS), styrene-maleic anhydride, modified polyphenylene oxide (PPO), and the like and mixture thereof.

Polymer(s) (b) can also be elastomeric in nature, examples include, but are not limited to, ethylene-propylene rubber (EPDM), polybutadiene, polychloroprene, polyisoprene, polyurethane (TPU), styrene-butadiene-styrene (SBS), styrene-ethylene-butadiene-styrene (SEEBS), polymethylphenyl siloxane (PMPS), and the like.

These polymers can be blended either alone or in combinations or in the form of coplymers, e.g. polycarbonate-ABS blends, polycarbonate polyester blends, grafted polymers such as, silane-grafted polyethylenes, and silane-grafted polyurethanes.

In one embodiment of the present invention, polymer(s) (b) is selected from the group consisting of low density polyethylene (LDPE), very low density polyethylene (VLDPE), linear low density polyethylene (LLDPE), high density polyethylene (HDPE), and mixtures thereof. In another embodiment of the invention, polymer(s) (b) is selected from the group consisting of low density polyethylene (LDPE), very low density polyethylene (VLDPE), linear low density polyethylene (LLDPE), and mixture thereof. In yet another embodiment of the present invention, polymer (b) is linear low density polyethylene (LLDPE).

Catalysts typically used in the preparation of the above mentioned urethane prepolymers as well as the related silylated polyurethanes (SPUR) include, those known to be useful for facilitating crosslinking in silicone sealant compositions. The catalyst may include metal and non-metal catalysts. Examples of the metal portion of the metal condensation catalysts useful in the present invention include tin, titanium, zirconium, lead, iron cobalt, antimony, manganese, bismuth and zinc compounds.

In one embodiment of the present invention, tin compounds useful for facilitating crosslinking in silicone sealant compositions include: tin compounds such as dibutyltindilaurate, dibutyltindiacetate, dibutyltindimethoxide, tinoctoate, isobutyltintriceroate, dibutyltinoxide, solubilized dibutyl tin oxide, dibutyltin bis-diisooctylphthalate, bis-tripropoxysilyl dioctyltin, dibutyltin bis-acetylacetone, silylated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, and tin-butyrate, and the like. In still another embodiment, tin compounds useful for facilitating crosslinking in silicone sealant compositions are chelated titanium compounds, for example, 1,3-propanedioxytitanium bis(ethylacetoacetate); di-isopropoxytitanium bis(ethylacetoacetate); and tetra-alkyl titanates, for example, tetra n-butyl titanate and tetra-isopropyl titanate. In yet another embodiment of the present invention, diorganotin bis β-diketonates is used for facilitating crosslinking in silicone sealant composition.

In one aspect of the present invention, the catalyst is a metal catalyst. In another aspect of the present invention, the metal catalyst is selected from the group consisting of tin compounds, and in yet another aspect of the invention, the metal catalyst is dibutyltin dilaurate.

The silicone composition of the present invention can include one or more alkoxysilanes as adhesion promoters. In one embodiment, the adhesion promoter can be a combination N-2-aminoethyl-3-aminopropyltrimethoxysilane and 1,3,5-tris(trimethoxysilylpropyl)isocyanurate. Other adhesion promoters useful in the present invention include N-2-aminoethyl-3-aminopropyltriethoxysilane, γ-aminopropyltriethoxysilane, γ-aminopropyltrimethoxysilane, aminopropyltrimethoxysilane, bis-γ-trimethoxysilypropyl) amine, N-Phenyl-γ-aminopropyltrimethoxysilane, triaminofunctionaltrimethoxysilane, γ-aminopropylmethyldiethoxysilane, γ-aminopropylmethyldiethoxysilane, methacryloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, β-(3,4-epoxycyclohexyl)propyltrimethoxysilane, β-(3,4-epoxycyclohexyl) ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, 4-amino-3,3,-dimethylbutyltrimethoxysilane, N-ethyl-3-trimethoxysilyl-2-methylpropanamine, and the like.

Optionally, the curable sealant composition herein can also contain one or more fillers such as calcium carbonate, precipitated calcium carbonate, colloidal calcium carbonate, ground, precipitated and colloidal calcium carbonates which is treated with compounds such as stearate or stearic acid, reinforcing silicas such as fumed silicas, precipitated silicas, silica gels and hydrophobized silicas and silica gels; crushed and ground quartz, alumina, aluminum hydroxide, titanium hydroxide, diatomaceous earth, iron oxide, carbon black and graphite, talc, mica, and the like.

In one aspect of the present invention, the filler component of the curable composition is calcium carbonate, silica or a mixture thereof. The type and amount of filler added depends upon the desired physical properties for the cured silicone composition. As such, the filler may be a single species or a mixture of two or more species.

Other useful fillers can be nanoclays which possess a unique morphology with one dimension being in the nanometer range. The nanoclays can form chemical complexes with an intercalant that ionically bonds to surfaces in between the layers making up the clay particles. This association of intercalant and clay particles results in a material which is compatible with many different kinds of host resins permitting the clay filler to disperse therein.

When describing the nanoclays of the present invention, the following terms have the following meanings, unless otherwise indicated.

The term "exfoliation" as used herein describes a process wherein packets of nanoclay platelets separate from one another in a polymer matrix. During exfoliation, platelets at the outermost region of each packet cleave off, exposing more platelets for separation.

The term "gallery" as used herein describes the space between parallel layers of clay platelets. The gallery spacing changes depending on the nature of the molecule or polymer occupying the space. An interlayer space between individual nanoclay platelets varies, again depending on the type of molecules that occupy the space.

The term "intercalant" as used herein includes any inorganic, organic or semi-organic compound capable of entering the clay gallery and bonding to the surface.

The term "intercalate" as used herein designates a clay-chemical complex wherein the clay gallery spacing has increased due to the process of surface modification. Under the proper conditions of temperature and shear, an intercalate is capable of exfoliating in a resin matrix.

The expression "modified clay" as used herein designates a clay material that has been treated with any inorganic, organic or semi-organic compound that is capable of undergoing ion exchange reactions with the cations present at the interlayer surfaces of the clay.

The term "nanoclay" as used herein describes clay materials that possess a unique morphology with one dimension being in the nanometer range. Nanoclays can form chemical complexes with an intercalant that ionically bonds to surfaces in between the layers making up the clay particles. This association of intercalant and clay particles results in a material which is compatible with many different kinds of host resins permitting the clay filler to disperse therein.

The expression "organic nanoclay" as use herein describes a nanoclay that has been treated or modified with an organic intercalant.

The term "organoclay" as used herein designates a clay or other layered material that has been treated with organic molecules (variously referred to as "exfoliating agents," "surface modifiers" or "intercalants") that are capable of undergoing ion exchange reactions with the cations present at the interlayer surfaces of the clay.

The nanoclays can be natural or synthetic materials. This distinction can influence the particle size and for this invention, the particles should have a lateral dimension of between about 0.01 μm and about 5 μm, and preferably between about 0.05 μm and about 2 μm, and more preferably between about 0.1 μm and about 1 μm. The thickness or the vertical dimension of the particles can in general vary between about 0.5 run and about 10 nm and preferably between about 1 nm and about 5 nm.

Useful nanoclays for providing the filler component include natural or synthetic phyllosilicates, particularly smectic clays such as montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, talc, mica, kaolinite, vermiculite, halloysite, aluminate oxides, or hydrotalcites, and the like, and their mixtures. In another embodiment, useful layered materials include micaceous minerals such as illite and mixed layered illite/smectite minerals such as rectorite, tarosovite, ledikite and admixtures of illites with one or more of the clay minerals named above. Any swellable layered material that sufficiently sorbs the organic molecules to increase the interlayer spacing between adjacent phyllosilicate platelets to at least about 5 angstroms, or to at least about 10 angstroms, (when the phyllosilicate is measured dry) can be used to provide the curable compositions of the invention.

In one embodiment of the present invention, organic and inorganic compounds useful for treating or modifying the clays and layered materials include cationic surfactants such as ammonium, ammonium chloride, alkylammonium (primary, secondary, tertiary and quaternary), phosphonium or sulfonium derivatives of aliphatic, aromatic or arylaliphatic amines, phosphines or sulfides.

Other organic treating agents for nanoclays that can be used herein include amine compounds and/or quaternary ammonium compounds $R^6 R^7 R^8 N^+ X^-$ each independently is an alkoxy silane group, alkyl group or alkenyl group of up to 60 carbon atoms and X is an anion such as $Cl^-$, $F^-$, $SO_4^-$, etc.

The compositions of the present invention can also include one or more non-ionic surfactants such as polyethylene glycol, polypropylene glycol, ethoxylated castor oil, oleic acid ethoxylate, alkylphenol ethoxylates, copolymers of ethylene oxide (EO) and propylene oxide (PO) and copolymers of silicones and polyethers (silicone polyether copolymers), copolymers of silicones and copolymers of ethylene oxide and propylene oxide and mixtures thereof.

The curable compositions of the present invention can include still other ingredients that are conventionally employed in RTC silicone-containing compositions such as colorants, pigments, plasticizers, cure accelerators, thixotropic agents, moisture scavengers, dyes, solvents, antioxidants, UV stabilizers, biocides, etc., in known and conventional amounts provided they do not interfere with the properties desired for the cured compositions.

The amounts of moisture-curable silylated resin (a), other polymer (b), and optional components, such as, filler(s), crosslinking catalyst(s), adhesion promoter(s) and ionic surfactant(s) disclosed herein can vary widely and, advantageously, can be selected from among the ranges indicated in the following table.

TABLE 1

Ranges of Amounts (Weight Percent) of the Components of the Moisture-Curable Silylated Resin-Containing Composition of the Invention

| Components of the Composition | First Range | Second Range | Third Range |
|---|---|---|---|
| moisture-curable silylated resin (a) | 1-99 | 10-50 | 20-30 |
| other polymer (b) | 1-99 | 5-50 | 10-20 |
| filler(s) | 0.1-80 | 10-60 | 20-55 |
| Catalyst(s) | 0.001-1 | 0.003-0.5 | 0.005-0.2 |
| Silane Adhesion Promoter(s) | 0-20 | 0.3-10 | 0.5-2 |
| Ionic Surfactant(s) | 0-10 | 0.1-5 | 0.5-0.75 |

The cured sealant compositions herein can be obtained by procedures that are well known in the art, e.g., melt blending, extrusion blending, solution blending, dry mixing, blending in a Banbury mixer, etc., in the presence of moisture to provide a substantially homogeneous mixture.

While the preferred embodiment of the present invention has been illustrated and described in detail, various modifications of, for example, components, materials and parameters, will become apparent to those skilled in the art, and it is intended to cover in the appended claims all such modifications and changes which come within the scope of this invention.

What is claimed is:

1. A moisture-curable silylated resin-containing composition comprising:
    a) moisture-curable silylated resin, prepared by reacting a hydroxyl-terminated polyurethane prepolymer with and isocyanatosilane, wherein the hydroxyl terminated prepolymer is prepared by reacting a molar excess of a polyol selected from the group consisting of poly(oxyethylene) diols, poly(oxypropylene) diols, poly(oxyethylene-oxypropylene) diols, polyoxyalkylene triols and polytetramethylene glycols, having a number average molecular weight of from 4,000 to 18,000 grams/mole and an end group unsaturation level no greater than 0.04 milliequivalent per gram of polyol with a diisocyanate and wherein the isocyanatosilane is of the formula:

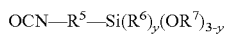

$OCN-R^5-Si(R^6)_y(OR^7)_{3-y}$ where $R^5$ is an alkylene group of up to 12 carbon atoms; $R^6$ is a alkyl or aryl group of up to 8 carbon atoms; $R^7$ is the same or different alkyl group of up to 6 carbon atoms; and y is 0, 1 or 2 which upon curing, provides a cured resin exhibiting permeability to gas;
    b) at least one other polymer having a permeability to gas that is less than the permeability of cured resin (a); and,
    c) at least one nanoclay modified with a cationic surfactant-exfoliating agent, wherein the nanoclay particles have a lateral dimension of between 0.01 microns and 5 microns and a vertical dimension of between 0.5 nanometers to 10 nanometers.

2. The composition of claim 1 wherein moisture-curable silylated resin (a) ranges from about 10 to about 50 weight percent of the total composition.

3. The composition of claim 1 wherein moisture-curable silylated resin (a) ranges from about 20 to about 30 weight percent of the total composition.

4. The composition of claim 1 wherein polymer (b) is selected from the group consisting of low density polyethylene, very low density polyethylene, linear low density polyethylene, high density polyethylene, polypropylene, polyisobutylene, polyvinyl acetate, polyvinyl alcohol, polystyrene, polycarbonate, polyester, such as, polyethylene terephthalate, polybutylene terephthalate, polyethylene napthalate, glycol-modified polyethylene terephthalate, polyvinylchloride, polyvinylidene chloride, polyvinylidene fluoride, thermoplastic polyurethane, acrylonitrile butadiene styrene, polymethylmethacrylate, polyvinyl fluoride, polyamides, polymethylpentene, polyimide, polyetherimide, polyether ether ketone, polysulfone, polyether sulfone, ethylene chlorotrifluoroethylene, polytetrafluoroethylene, cellulose acetate, cellulose acetate butyrate, plasticized polyvinyl chloride, ionomers, polyphenylene sulfide, styrene-maleic anhydride, modified polyphenylene oxide, ethylene-propylene rubber, polybutadiene, polychloroprene, polyisoprene, polyurethane, styrene-butadiene-styrene, styrene-ethylene-butadiene-styrene, polymethylphenyl siloxane and mixtures thereof.

5. The composition of claim 4 wherein polymer (b) is selected from the group consisting of low density polyethylene, very low density polyethylene, linear low density polyethylene, high density polyethylene, and mixtures thereof.

6. The composition of claim 5 wherein polymer (b) is selected from the group consisting of low density polyethylene, very low density polyethylene, linear low density polyethylene, and mixtures thereof.

7. The composition of claim 1, wherein polymer (b) ranges from about 5 to about 50 weight percent of the total composition.

8. The composition of claim 1, wherein polymer (b) ranges from about 10 to about 20 weight percent of the total composition.

9. The composition of claim 1 further comprising a catalyst wherein the catalyst is a tin catalyst.

10. The composition of claim 1 wherein the tin catalyst is selected from the group consisting of dibutyltin dilaurate, dibutyltindiacetate, dibutyltindimethoxide, tinoctoate, isobutyltintriceroate, dibutyltinoxide, solubilized dibutyl tin oxide, dibutyltin bis-diisooctylphthalate, bis-tripropoxysilyl dioctyltindibutyltin bis-acetylacetone, silylated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, tinbutyrate, diorganotin bis β-diketonates, and mixtures thereof.

11. The composition of claim 1 further comprising an adhesion promoter wherein the adhesion promoter is selected from the group consisting of N-2-aminoethyl-3-aminopropyltrimethoxysilane, 1,3,5-tris(trimethoxysilylpropyl)isocyanurate, γ-aminopropyltriethoxysilane, γ-aminopropyltrimethoxysilane, aminopropyltrimethoxysilane, bis-γ-(trimethoxysilylpropyl)amine, N-phenyl-γ-aminopropyltrimethoxysilane, triaminofunctionaltrimethoxysilane, γ-aminopropylmethyldiethoxysilane, γ-aminopropylmethyldiethoxysilane, methacryloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, β-(3,4-epoxycyclohexyl)propyltrimethoxysilane, β-(3,4-epoxycyclohexyl)ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, 4-amino-3,3,-dimethylbutyltrimethoxysilane, N-ethyl-3-trimethoxysilyl-2-methylpropanamine, and mixtures thereof.

12. The composition of claim 1 further comprising at least one additional filler wherein said at least one additional filler is selected from the group consisting of calcium carbonate, precipitated calcium carbonate, colloidal calcium carbonate, calcium carbonate treated with compounds such as stearic acid or stearate esters fumed silica, precipitated silica, silica gels, hydrophobized silicas, hydrophilic silica gels, crushed quartz, ground quartz, alumina, aluminum hydroxide, titanium hydroxide, clay, kaolin, bentonite montmorillonite, diatomaceous earth, iron oxide, carbon black and graphite, mica, talc, and mixtures thereof.

13. The composition of claim 1 wherein the nanoclay is selected from the group consisting of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, kaolinite and, mixtures thereof.

14. The composition of claim 13 wherein the nanoclay is modified with ammonium, primary alkylammonium, secondary alkylammonium, tertiary alkylammonium, quaternary alkylammonium, phosphonium derivatives of aliphatic, aromatic or arylaliphatic amines, phosphines or sulfides or sulfonium derivatives of aliphatic, aromatic or arylaliphatic amines, phosphines or sulfides.

15. The composition of claim 13 wherein the nanoclay is modified with at least one tertiary amine compound $R^3R^4R^5N$ and/or quarternary ammonium compound $R^5R^6R^7R^8N^+$ $X^-$ wherein $R^3$, $R^4$, $R^5$, $R^6$, $R^7$ and $R^8$ each independently is an alkyl, alkenyl or alkoxy silane group of up to 60 carbon atoms and $X^-$ is an anion.

16. The composition of claim 1 further comprising a surfactant, wherein the surfactant is a nonionic surfactant selected from the group consisting of polyethylene glycol, polypropylene glycol, ethoxylated castor oil, oleic acid ethoxylate, alkylphenol ethoxylates, copolymers of ethylene oxide and propylene oxide and copolymers of silicones and polyethers, copolymers of silicones and copolymers of ethylene oxide and propylene oxide and mixtures thereof.

17. The composition of claim 16 wherein the non-ionic surfactant is selected from the group consisting of copolymers of ethylene oxide and propylene oxide, copolymers of silicones and polyethers, copolymers of silicones and copolymers of ethylene oxide and propylene oxide and mixtures thereof.

18. A sealant, adhesive or coating composition prepared with the moisture-curable silylated resin-containing-composition of claim 1.

19. A sealant, adhesive or coating composition prepared with polymer (b) of claim 4.

20. A sealant, adhesive or coating composition prepared with the nanoclay composition of claim 15.

21. The cured silylated resin-containing composition of claim 1.

22. The cured silylated resin-containing composition of claim 4.

23. The cured silylated resin-containing composition of claim 15.

* * * * *